United States Patent
Emorine et al.

(10) Patent No.: US 9,333,810 B2
(45) Date of Patent: May 10, 2016

(54) TIRE TREAD COMPRISING A WEAR INDICATOR

(75) Inventors: Hélène Emorine, Clemont-Ferrand (FR); Sylvain Petitjean, Clermont-Ferrand (FR); William License, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 485 days.

(21) Appl. No.: 13/809,437

(22) PCT Filed: Jul. 12, 2011

(86) PCT No.: PCT/EP2011/061861
§ 371 (c)(1),
(2), (4) Date: Feb. 1, 2013

(87) PCT Pub. No.: WO2012/007464
PCT Pub. Date: Jan. 19, 2012

(65) Prior Publication Data
US 2013/0206291 A1     Aug. 15, 2013

(30) Foreign Application Priority Data
Jul. 12, 2010   (FR) ...................... 10 55662

(51) Int. Cl.
*B60C 11/12*      (2006.01)
*B60C 11/24*      (2006.01)
(Continued)

(52) U.S. Cl.
CPC ............ *B60C 11/24* (2013.01); *B29D 30/0662* (2013.01); *B60C 11/0323* (2013.04); *B60C 11/124* (2013.04); *B60C 11/1281* (2013.04); *Y10T 152/10027* (2015.01)

(58) Field of Classification Search
CPC .. B60C 11/124; B60C 11/1281; B60C 11/24; B60C 11/0323
USPC .............................. 152/154.2, 209.19, 209.21
See application file for complete search history.

(56) References Cited

U.S. PATENT DOCUMENTS 3,770,040 A    11/1973   De Cicco
4,154,564 A     5/1979   French
(Continued)

FOREIGN PATENT DOCUMENTS

EP      0667251      *   8/1995
EP      1 066 991 A2    1/2001
(Continued)

OTHER PUBLICATIONS

English machine translation of EP0667251, dated Aug. 1995.*
(Continued)

*Primary Examiner* — Steven D Maki
*Assistant Examiner* — Robert Dye
(74) *Attorney, Agent, or Firm* — Dickinson Wright PLLC

(57) ABSTRACT

Vulcanizing device with radially mobile segments comprising:
a bottom plate supporting a bottom shell for molding a tire sidewall,
an axially mobile top plate supporting a top shell for molding a tire sidewall,
an axially mobile closure ring comprising an inclined interior face,
a plurality of circumferentially arranged adjacent segments of which the interior radial faces comprise linings for molding the tread of the tire and of which the inclined exterior radial faces are able to collaborate with:
first means of coupling with the closure ring which are produced in such a way that the axial movements of the closure ring involve a radial movement of the segments, and
second means of coupling the segments to the top plate which are able to connect the segments to the top plate and to allow their radial movement, the said second means of coupling being adjustable on the circumference of the top plate.

7 Claims, 4 Drawing Sheets

(51) Int. Cl.
*B60C 11/03* (2006.01)
*B29D 30/06* (2006.01)

(56) References Cited

U.S. PATENT DOCUMENTS

| 7,546,861 B2 * | 6/2009 | Nguyen et al. ............ 152/209.18 |
| 2005/0081971 A1 | 4/2005 | Heinen |
| 2008/0023116 A1 | 1/2008 | Mayni et al. |
| 2009/0008009 A1 | 1/2009 | Mosko et al. |
| 2009/0218019 A1 * | 9/2009 | Paturle .................... 152/209.18 |

FOREIGN PATENT DOCUMENTS

| EP | 1 524 131 A2 | 4/2005 |
| JP | 2001-130227 * | 5/2001 |
| JP | 2005-67407 A | 3/2005 |
| WO | WO 2007/045425 A1 | 4/2007 |
| WO | WO 2007/102790 A2 | 9/2007 |

OTHER PUBLICATIONS

International Search Report (PCT/ISA/210) issued on Aug. 17, 2011, by the European Patent Office as the International Searching Authority for International Application No. PCT/EP2011/061861.
French Search Report dated Dec. 3, 2010.

\* cited by examiner

TIRE TREAD COMPRISING A WEAR INDICATOR

BACKGROUND

1. Field

Disclosed herein is a tire tread for a passenger vehicle comprising particular means for alerting an observer on the state of wear of this tire.

2. Description of Related Art

Document EP 1066991 A2 discloses a tire tread provided with a plurality of sipes making it possible to obtain an item of information on the state of wear of the tire during the use of the said tire.

"Tire" means all types of elastic tires subjected, when running, to a pressure that may or may not be internal.

"Tire tread" means a quantity of rubbery composition delimited by lateral surfaces and by two main surfaces of which one is designed to come into contact with a ground when the tire runs.

"Tread surface" means the surface formed by the points of the tire tread that come into contact with the ground when the tire runs.

"Sipe" is a cut-out of which the material faces touch one another in usual running conditions. Generally, the width of a sipe is less than 2 mm.

In document EP 1066991 A2, sipes extending in the depth of the tread emerge on the tread surface to form the message "very good condition".

The sipe forming the word "very" extends in a lesser depth than the word "good". In the same manner, the word "good" extends in a lesser depth than the word "condition".

Therefore, in the new state, it is possible to read the message "very good condition" in its entirety on the tread surface.

When the tire tread reaches a first rate of wear, the word "very" can no longer be read on the tread surface.

"Wear rate" means the ratio between a thickness that the tread has lost through wear and the total thickness that the tread can lose before having to be replaced.

Therefore, a wear rate of 25% means that the tread has lost a quarter of the rubbery composition to be worn.

In document EP 1066991 A2, when the tire tread reaches a second wear rate greater than the first wear rate, the word "good" can no longer be read on the tread surface.

Finally, when the tire tread reaches a third wear rate greater than the second wear rate, the word "condition" can no longer be read on the tread surface.

The disappearance of the whole message "very good condition" on the tread surface means that it is necessary to replace the tire.

The wear indicator disclosed in document EP 1066991 A2 has a certain number of drawbacks.

First of all, the disappearance of the message on the tread surface may not sufficiently alert the observer to the need to change the tire. Specifically, the disappearance of the message makes the tread surface visually more even. The observer may then wrongly believe that the tire is still operational since nothing indicates the contrary to him.

Moreover, the sipes forming the message may be filled in by mud or dust during the use of the tire. Consequently, the legibility of the message on the tread surface is limited.

Finally, the use of a wear indicator according to the document disclosed above requires the tread to be provided with a plurality of sipes; this may then cause irregular wear of the tread close to these sipes.

There is therefore a need to provide a wear indicator making it possible to solve the problems explained above.

SUMMARY OF THE INVENTION

Disclosed herein is a tire tread for a passenger vehicle comprising a tread surface designed to come into contact with a ground when the said tire is running. The tread comprises at least one internal cavity of elongate overall shape with a total length LC and width WC and a sipe less than 2 mm wide beginning partly or totally on the cavity, the said sipe extending this cavity over the whole of its length LC while extending radially outwards in order to emerge on the tread surface. The cavity comprises a bottom and two lateral walls surrounding this bottom and extending in the length LC of the cavity. The bottom comprises a message intended for an observer of the tire, the said message being at a distance from at least one lateral wall of the cavity. The distance between the message and this lateral wall is at least equal to 5% of the width WC of the cavity.

When the tread reaches a certain level of wear, a message appears. This ensures a certain surprise effect with the appearance of the message. Specifically, the observer is not used to the presence of such a message on the tread surface. This observer is therefore prompted by the presence of the message and becomes more receptive to the idea of having to change the worn tire.

The message therefore makes it possible to more effectively alert the observer on the advanced wear of the tire.

Moreover, the sipe protects the message from mud or dust during the use of the tire.

Finally, the distance that exists between the message and a lateral wall of the cavity improves the visibility of this message when the tread reaches a certain wear rate, for example when the tread reaches a wear rate of at least 90%.

Preferably, the message has a roughness that differs from the roughness of the bottom of the cavity so as to accentuate the visibility of the message in order to create a contrast relative to this bottom.

The visibility of the message relative to the rest of the tread is improved.

Moreover or alternatively, a surface of the message comprises a plurality of strands configured so as to accentuate the visibility of the message in order to create a contrast relative to the bottom of the cavity.

The visibility of the message relative to the rest of the tread is further improved.

Moreover or alternatively, a surface of the message comprises a plurality of holes configured so as to accentuate the visibility of the message in order to create a contrast relative to the bottom of the cavity.

The visibility of the message relative to the rest of the tread is further improved.

Moreover or alternatively, the message is coloured so as to accentuate the visibility of the message in order to create a contrast relative to the bottom of the cavity.

The visibility of the message relative to the rest of the tread is further improved.

Preferably, the message is placed on the bottom of the cavity without being radially level with an intersection of the sipe with the cavity.

If the message is aligned with the sipe, the latter can appear progressively to the observer even before the wear of the tread reaches the predetermined wear threshold. By offsetting the message relative to the sipe so that it is not radially level with the intersection of the cavity and of the sipe, a sudden appearance of the said message is promoted. The message then makes it possible to more effectively alert the observer to the wear of the tire.

Preferably, the sipe makes an angle of between 45° and 60° with a perpendicular to the tread surface and passing through a point of intersection of the sipe with the cavity.

This then promotes a sudden appearance of the message.

Preferably, the tread comprises at least two cavities and one sipe connecting the said cavities, each cavity comprising a message, the cavities being placed radially at different distances from the tread surface so that the messages associated with the said cavities appear on the tire at different rates of wear of the tread, each message giving an item of information associated with a rate of wear revealing the said message.

It is thus possible to reveal a message when the tread reaches an intermediate wear rate. The observer can then ascertain simply and practically an intermediate state of wear of the tread.

Another subject of the invention relates to a moulding element for a mould for a passenger vehicle tire comprising a tread. The moulding element comprises a bulge of elongate overall shape with a total length LR and width WR and a metal strip less than 2 mm wide secured to this bulge at one end of the said strip, the said metal strip extending the bulge over the whole of its length LC at an upper portion of the said bulge. The bulge of the moulding element comprises a lower portion opposite to the upper portion and two lateral portions surrounding the lower portion and extending in the length LC of the bulge. The lower portion comprises a plurality of protuberances and a plurality of hollows designed to mould a message in the tread of the tire intended for an observer of the tire. The plurality of protuberances or the plurality of hollows is at a distance from at least one edge of the lower portion formed by the intersection of the lower portion with a lateral portion of the bulge, the distance between the plurality of protuberances or the plurality of hollows and the said edge being at least equal to 5% of the width WR of the bulge.

As a variant, the lower portion of the bulge comprises a plurality of holes in the bottom of the hollows in order to mould strands on the message.

BRIEF DESCRIPTION OF THE DRAWINGS

Other features and advantages of the invention will emerge from the following description given as an example with no limiting character with respect to the appended drawings in which.

DETAILED DESCRIPTION OF SPECIFIC EMBODIMENTS

In the description that follows, elements that are substantially identical or similar will be designated by identical references.

In a manner known per se, a tire tread comprises a tread surface designed to come into contact with a ground when the said tire is running.

Figure 1:
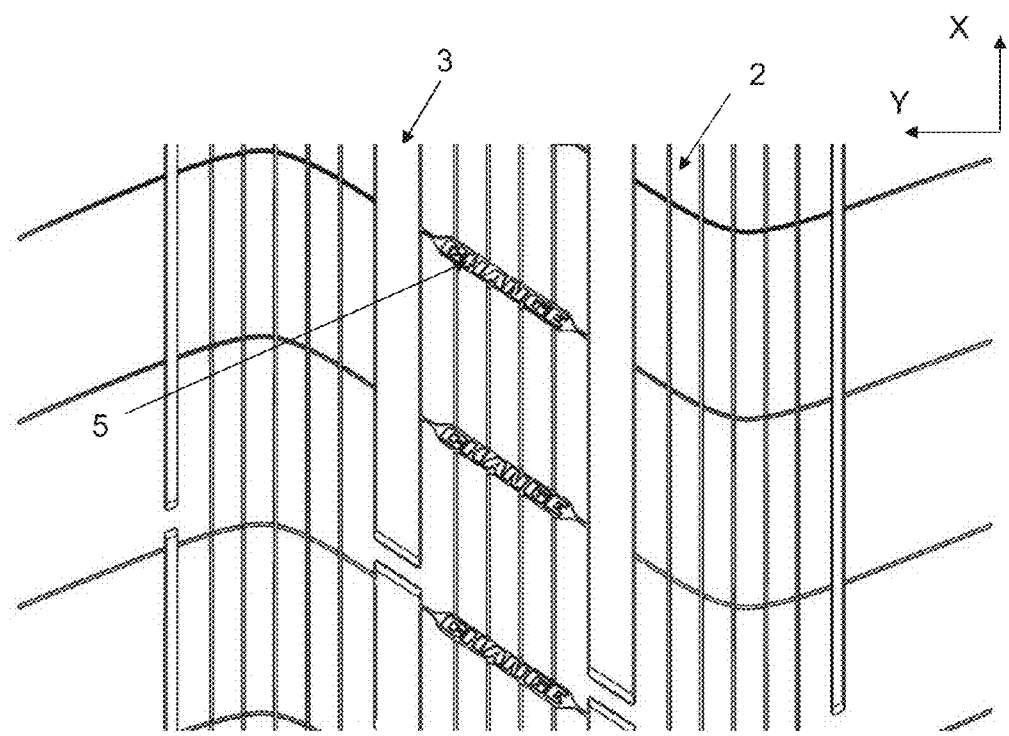
FIG. 1 represents a partial view of the tread surface of a tread according to the invention, the said tread being in a state of wear in which messages can be seen.

FIG. 1 shows a partial view of such a tread surface 2 according to an embodiment disclosed herein.

The tread surface 2 in this instance comprises a groove 3.

"Groove" means a cut-out of which the material faces do not touch in usual running conditions. The width of a groove is in this particular instance greater than or equal to 2 mm.

The groove 3 in this instance extends in a circumferential direction X.

"Circumferential direction" means a direction tangential to a circle of which the centre is on an axis of rotation of a tire provided with the tread.

The tread surface 2 is in this instance in a state of advanced wear.

In this state of wear, the tread surface 2 comprises a plurality of messages 5 extending in an oblique direction forming a predetermined angle greater than 0 degree and less than 90 degrees with a transverse direction Y.

"Transverse direction" means a direction parallel to the axis of rotation of the said tire.

In a variant embodiment, the message extends exclusively in the circumferential direction X.

In another variant embodiment, the message extends exclusively in the transverse direction Y.

"Message" means a group of symbols forming a meaning unit.

In this instance, the message comprises symbols of the Latin alphabet forming the word "CHANGE".

As a variant, the message may be a warning symbol. For example, the message may be an exclamation mark inscribed in a triangle or a form of face with a negative expression.

The word "CHANGE" gives the item of information to an observer that it is time to replace the tire.

The message 5 is thus directly comprehensible to the observer without it being necessary for him to consult any reference.

The message 5 in this instance consists of a single word.

In a variant embodiment, the message 5 may comprise a group of words.

Figure 2:
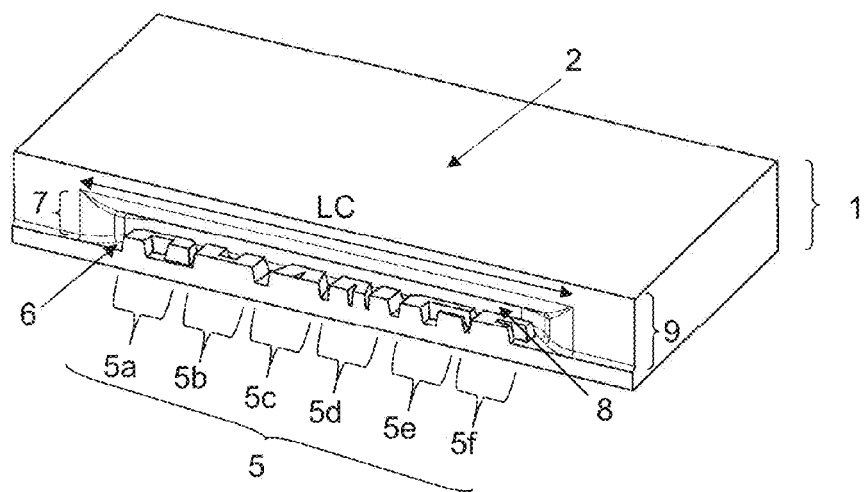
FIG. 2 represents in perspective a section of a portion of the tread according to the invention in the new state, the said section extending in the length of the message of FIG. 1, the said message being associated with a sipe, the said message and the said sipe being configured according to a first configuration mode.

FIG. 2 represents in perspective a section of a portion of the tread at the level of the message 5.

The tread 1 comprises a cavity 7 placed radially inside the tread 1. The cavity has an elongate overall shape with a total length LC and width WC (not shown). More particularly, the cavity comprises a bottom 6 and two lateral walls 8 surrounding this bottom. In this instance only one lateral wall 8 is shown.

The tread 1 also comprises a sipe 9 by which the cavity 7 emerges on the tread surface 2.

"Sipe" means a cut-out of which the material faces touch one another in usual running conditions. The width of a sipe is in this instance less than 2 mm.

The sipe 9 begins on the cavity 7, that is to say that the sipe emerges in the cavity but does not extend radially inwardly beyond the cavity. More particularly, the sipe in this instance begins partially on the cavity, the length of the sipe 9 being greater than the length LC of the cavity 7. As a variant, the length of the sipe and the length of the cavity are identical and the sipe begins fully on the cavity.

The tread 1 also comprises a message 5 intended for an observer.

The message 5 in this instance protrudes from the bottom 6 of the cavity and is at a distance from the lateral walls of the cavity. More particularly, the message comprises a plurality of protuberances 5a, 5b, 5c, 5d, 5e, 5f, each of the said protuberances forming respectively a letter of the word "CHANGE".

As a variant, the message 5 is cut out in the bottom 6 of the cavity.

Figure 3A:
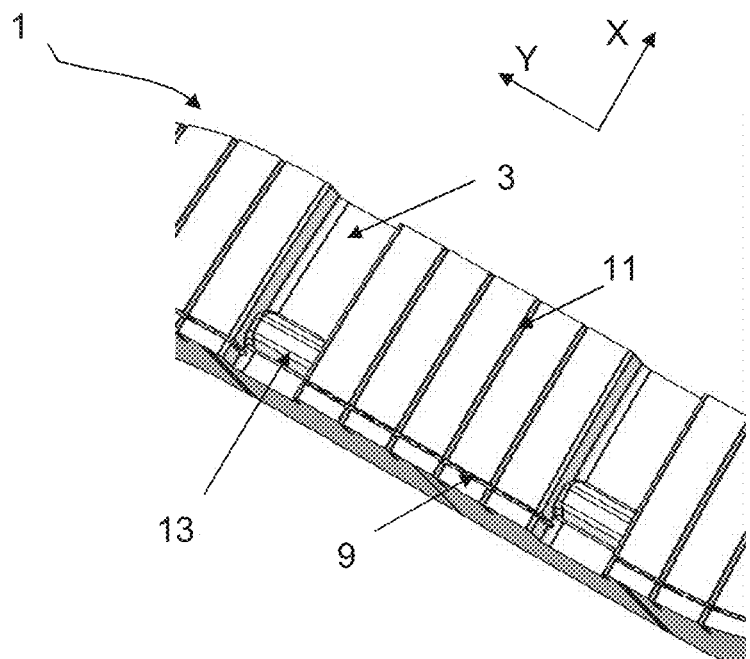
FIG. 3a represents a view in perspective of a portion of the tread according to the invention in a new state.
Figure 3B:
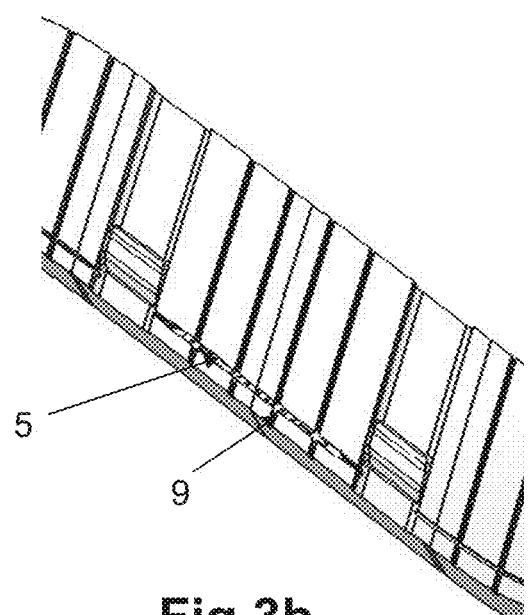
FIG. 3b represents a view in perspective of a portion of the tread according to the invention in a state of intermediate wear.
Figure 3C:
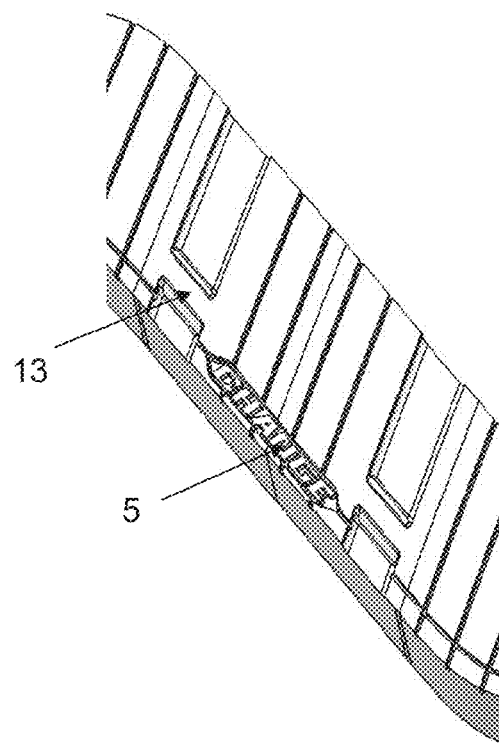
FIG. 3c represents a view in perspective of a portion of the tread according to the invention in a state of advanced wear, in which a message is fully visible.

FIGS. 3a, 3b, 3c represent various partial views in perspective of what an observer might see when looking at the tread surface of the tire, at different wear rates of the tread.

FIG. 3a represents more particularly what the observer might see when the tread is in the new state.

In the example of FIG. 3a, the tread 1 comprises a transverse sipe 9 emerging in the cavity 7 and circumferential sipes 11.

The transverse sipe 9 in this instance extends in the transverse direction Y.

The circumferential sipes extend in this instance in the circumferential direction X.

The tread 1 also comprises a groove 3 and a wear indicator 13 protruding from the bottom of the said groove 3.

The wear indicator 13 is used to monitor the wear of the tread of the tire 1. It is therefore possible to compare the thickness of the tread 2 with the limit height of the wear indicator 13. When the thickness of the tread reaches the limit height of the wear indicator 13, it is necessary to replace the tire.

The wear indicator 13 is not a message within the meaning of the invention. Specifically, the wear indicator 13 is not a group of symbols forming a sense unit. Moreover, the wear indicator 13 can always be seen by the observer irrespective of the wear rate of the tread 1.

It will be noted that the limit height of the wear indicator is of the order of 1.6 mm.

FIG. 3b represents what the observer might see when the tread is half worn.

In this figure, the message 5 can be partially seen by the observer. However, at this wear rate, it is not possible for an observer to clearly understand the message 5.

FIG. 3c represents what the observer might see when the tread reaches a wear rate of 90%, that is to say in this instance when the thickness of the tread reaches the limit height of the wear indicator 13. At this wear rate, the message "CHANGE" is fully visible for the observer.

Naturally, it is possible to choose a different wear rate for the appearance of the message 5. It is thus possible to choose a wear rate below 90%, for example a wear rate of 70%. It is also possible to choose a wear rate higher than 90%, for example a wear rate of 95%.

Figure 4:
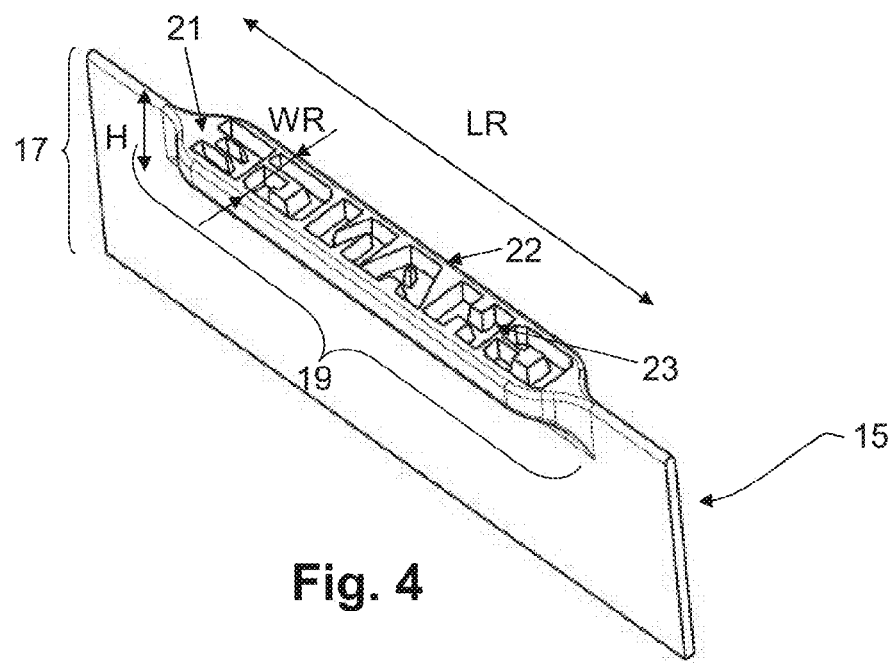
FIG. 4 represents a view in perspective of a bar adapted to mould the message of FIG. 3c.

FIG. 4 shows a view in perspective of a bar 15 adapted for moulding the message of FIG. 3c.

The bar 15 comprises a metal strip 17 also called the body 17 and bulge 19 also called the head. The head 19 is in this instance made of the same material with the body 17. The head 19 is adapted for moulding the cavity containing the message. The body 17 is adapted for moulding the sipe 9 through which the cavity emerges.

Preferably, the height H of the head 19 corresponds to the height of the wear indicator of FIG. 3c. Thus, when the thickness of the tread is less than or equal to 1.6 mm, the message 5 is totally visible for the observer.

The head 19 comprises a lower portion comprising a moulding surface 21 and hollows 23 forming portions that are recessed relative to the moulding surface 21. The moulding surface 21 is adapted for moulding the bottom of the cavity. The recessed portions 23 are adapted for moulding the various letters of the message 5.

Preferably, the depth of the recessed portions is greater than 1 mm. The various letters of the message 5 moulded by the bar 15 are thus placed in relief relative to the bottom of the cavity.

In a variant embodiment, the head 19 comprises protuberances protruding from the moulding surface 21 to mould the letters of the message 5. These letters then form hollows in the bottom of the cavity.

The head 19 also comprises lateral portions. The recessed portions 23 adapted for moulding the various letters of the message 5 are at a distance from at least one edge 22 of the lower portion formed by the intersection of this lower portion with a lateral portion of the bulge. The distance between the recessed portions 23 and this edge 22 is at least equal to 5% of the width WR of the bulge.

It will be noted that the bar 15 can be formed by the technique called selective laser melting. With this technique, the bar is produced by selective melting of a powder formed of grains with the aid of a laser beam.

In one particular embodiment, the roughness of the bottom of the recessed portions 23 is different from the roughness of the moulding surface 21. For example, the roughness of the bottom of the recessed portions 23 is greater than the roughness of the moulding surface 21. Thus, the roughness of the bottom of the recessed portions 23 may be between 0.005 mm and 0.02 mm and the roughness of the moulding surface 21 may be between 0.002 mm and 0.003 mm.

In a variant embodiment, the roughness of the bottom of the recessed portions 23 is less than the roughness of the moulding surface 21.

Through this difference in roughness, the message formed creates a contrast relative to the bottom of the cavity, which increases the visibility of the message.

It will be noted that selective laser melting is particularly suitable for creating differences in roughness.

In a variant embodiment, the bottom of the recessed portions 23 comprises a plurality of holes configured so as to form strands on the protuberances so as to accentuate the visibility of the message. For more information on the characteristics of these strands, express reference is made to document WO 2007/045425, the entire content of which is incorporated herein by reference.

It will be noted that it is possible to obtain an equivalent visibility of the message by placing strands on the bottom of the recessed portions 23 so as to form holes in the protuberances forming the message.

In a variant embodiment, the message 5 is coloured. For this purpose, a colour band is placed on the tread of the tire before the tread is moulded in a vulcanizing press.

Once the tire has been placed in the vulcanizing mould, the bar 15 will sink a part of the colour band into the tread. The colour will then be found at the level of the protuberances forming the message.

In the embodiment of FIG. 3b, the message 5 is placed in the cavity so as to be centred relative to the sipe 9. More particularly, the message is at a distance from the two lateral walls of the cavity and the distance between the message and each of the said lateral walls is at least equal to 5% of the width of the cavity.

This particular arrangement of the message could, however, cause a degree of confusion in the mind of the observer.

Figure 5:
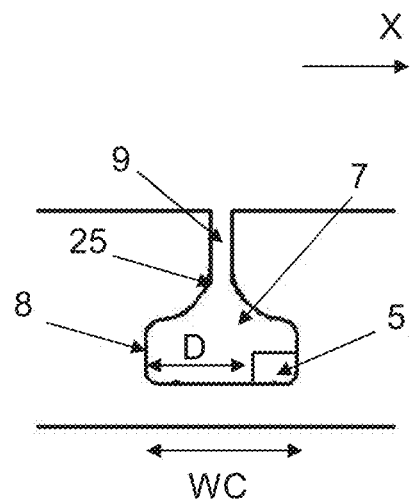
FIG. 5 represents schematically a view in circumferential section of the tread of FIG. 3a comprising a message and a sipe configured according to a second configuration mode.

To remedy this problem, it is proposed in FIG. 5 that the message 5 is not directly beneath the intersection 25 of the cavity 7 and of the sipe 9 but offset relative to the said sipe 9. Thus, the message 5 does not truly become visible until the wear of the tread reaches the intersection 25. This ensures an additional surprise effect in the appearance of the message. In the particular embodiment of FIG. 5, the message is made of the same material with a lateral wall of the cavity 7 and is at a distance from the other lateral wall 8 of the cavity. The distance D between the message 5 and this lateral wall 8 is at least equal to 5% of the width WC of the cavity.

Figure 6:
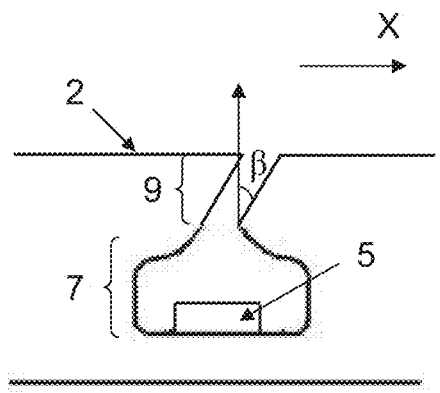
FIG. 6 represents schematically a view in circumferential section of the tread of FIG. 3a comprising a message and a sipe configured according to a third configuration mode.

It is also proposed in FIG. 6 that the sipe 9 is inclined relative to the tread surface 2 at an angle β of between 45° and 60°.

Thus, the message does not truly become visible until the wear of the tread reaches a point of inter-section of the sipe 9 with the cavity 7. A sudden appearance of the message on the tread is further promoted.

The present invention is not limited to the exemplary embodiments described.

Thus, the tread may comprise at least two cavities placed radially at different distances from the tread surface. The cavities comprise different messages. Consequently, the messages associated with the cavities appear on the tire at different wear rates of the tread, each message providing an item of information associated with the wear causing the said message to appear.

All combinations in the production of the messages are possible.

For example, it is possible to have messages having different colours.

In one variant embodiment, the tread comprises a group of messages appearing at one and the same wear rate. The group of messages comprises, for example, the word "CHANGE" and translations of this word in different languages. The messages may be aligned on the tread surface, for example the messages are aligned in the circumferential direction.

The invention claimed is:

1. A tire tread for a passenger vehicle comprising a tread comprising:
    a surface designed to come into contact with a ground when the said tire is running,
    at least one internal cavity of elongate overall shape with a total length LC and width WC, and
    a sipe less than 2 mm wide beginning partly or totally on the cavity, extending said cavity over the whole of its length LC while extending radially outwards in order to emerge on the tread surface, wherein the cavity comprises a bottom and two lateral walls surrounding this bottom and extending the length LC of the cavity, wherein said bottom comprises a message disposed at a distance from at least one lateral wall of the cavity, wherein the distance between the message and said lateral wall being is at least equal to 5% of the width WC of the cavity, and wherein the message is observable by an observer of the tire at a desired state of wear of the tire tread;
    wherein the sipe makes an angle (β) of between 45° and 60° with a perpendicular to the tread surface and passing through a point of intersection of the sipe with the cavity.

2. The tread according to claim 1, wherein the message and the bottom of the cavity have roughnesses that differ so as to accentuate the visibility of the message in order to create a contrast relative to the bottom of the cavity.

3. The tread according to claim 1, wherein the message comprises a plurality of strands configured so as to accentuate the visibility of the message in order to create a contrast relative to the bottom of the cavity.

4. The tread according to claim 1, wherein the message comprises a plurality of holes configured so as to accentuate the visibility of the message in order to create a contrast relative to the bottom of the cavity.

5. The tread according to claim 1, wherein the message is coloured so as to accentuate the visibility of the message in order to create a contrast relative to the bottom of the cavity.

6. The tread according to claim 1, wherein the message disposed on the bottom of the cavity without being directly below an intersection of the sipe with the cavity.

7. The tread according to claim 1, further comprising at least one additional cavity and one sipe connecting said cavities, each cavity comprising a message, the at least one additional cavity and the at least one internal cavity being placed radially at different distances from the tread surface so that the messages associated with each of the cavities appear on the tire at different rates of wear of the tread, each message giving an item of information associated with a rate of wear.

* * * * *